(12) United States Patent
Pailhories et al.

(10) Patent No.: US 11,156,246 B2
(45) Date of Patent: Oct. 26, 2021

(54) BLIND RIVET HAVING A SHOULDER SHANK AND ASSOCIATED INSTALLATION METHOD

(71) Applicant: LISI AEROSPACE, Paris (FR)

(72) Inventors: Guy Pailhories, Villefranche de Rouergue (FR); Olivier Gay, Commeny (FR)

(73) Assignee: LISI AEROSPACE, Paris (FR)

( * ) Notice: Subject to any disclaimer, the term of this patent is extended or adjusted under 35 U.S.C. 154(b) by 229 days.

(21) Appl. No.: 16/307,131

(22) PCT Filed: Jul. 3, 2017

(86) PCT No.: PCT/EP2017/066511
§ 371 (c)(1),
(2) Date: Dec. 4, 2018

(87) PCT Pub. No.: WO2018/007324
PCT Pub. Date: Jan. 11, 2018

(65) Prior Publication Data
US 2019/0186522 A1    Jun. 20, 2019

(30) Foreign Application Priority Data
Jul. 6, 2016 (FR) ...................... 1656469

(51) Int. Cl.
*F16B 13/04* (2006.01)
*F16B 19/10* (2006.01)
*B21J 15/04* (2006.01)

(52) U.S. Cl.
CPC ......... *F16B 19/1072* (2013.01); *B21J 15/045* (2013.01); *F16B 19/1054* (2013.01)

(58) Field of Classification Search
CPC .... F16B 19/1072; F16B 19/1054; B21J 5/045
(Continued)

(56) References Cited

U.S. PATENT DOCUMENTS 2,324,142 A      7/1943  Eklund
2,415,560 A  *   2/1947  Higley ................... F16B 19/12
                                              411/19

(Continued)

FOREIGN PATENT DOCUMENTS

EP         2960531       12/2015
FR         3016417       7/2015
WO     WO 2011/100658    8/2011

OTHER PUBLICATIONS

Fritzen, Claas, International Search Report, dated Sep. 29, 2017, 3 pages, European Patent Office, Rijswijk, Netherlands.

(Continued)

*Primary Examiner* — Gary W Estremsky
(74) *Attorney, Agent, or Firm* — Henricks Slavin LLP

(57) ABSTRACT

A rivet may include
a pin comprising: a threaded portion (36), a shank (38) and a head (40); and
a bushing (32) comprising an essentially cylindrical body, said body comprising a deformation zone designed to form an external bulge (80); a collar (70) designed to receive the head of the pin; and a tapped portion (66) designed to engage with the threaded portion of the pin. The shank (38) of the pin comprises a first cylindrical portion (44) and a second cylindrical portion (46) connected by a shoulder (48), the first portion being adjacent to the head and having a first diameter, the second portion being adjacent to the threaded portion and having a second, smaller diameter.

11 Claims, 3 Drawing Sheets

(58) Field of Classification Search
USPC .............................. 411/40, 41, 55, 60.2, 80.6
See application file for complete search history.

(56) References Cited

U.S. PATENT DOCUMENTS

| | | | | |
|---|---|---|---|---|
| 2,914,106 A | * | 11/1959 | Boyd ................... | F16B 19/1072 411/38 |
| 3,136,203 A | * | 6/1964 | Davis .................. | F16B 19/1072 411/38 |
| 3,322,449 A | * | 5/1967 | Becker ................ | F16B 19/1072 403/388 |
| 5,702,214 A | * | 12/1997 | Duran ................. | F16B 5/02 411/24 |
| 8,979,453 B2 | * | 3/2015 | Hufnagl .............. | F16B 19/1072 411/55 |

OTHER PUBLICATIONS

Fritzen, Claas, Written Opinion of the International Search Authority, dated Sep. 29, 2017, 7 pages, European Patent Office, Munich, Germany.

\* cited by examiner

BLIND RIVET HAVING A SHOULDER SHANK AND ASSOCIATED INSTALLATION METHOD

CROSS REFERENCE TO RELATED APPLICATIONS

This application is a National Stage of International Application No. Corresponds to PCT/EP2017/066511, filed Jul. 3, 2017, claiming priority to FR16 56469 filed Jul. 6, 2016, the entire contents of which are incorporated herein by reference.

This invention concerns a rivet, of the type comprising: a pin comprising a threaded portion, a shank and a head; and a bushing comprising an essentially cylindrical body, said body comprising a grip zone, designed to receive the shank of the pin, and a deformation zone, adjacent to the grip zone, designed to form an external bulge; a collar adjacent to the grip zone and designed to receive the head of the pin; and a tapped portion adjacent to the deformation zone designed to engage with the threaded portion of the pin.

The invention applies particularly to blind fasteners, namely fasteners installed through structures from only one side of said structures, commonly referred to as the "accessible" side. These fasteners are notably used in the assembly of aircraft structures.

A rivet of the aforementioned type and an associated installation method are notably described in document FR3016417.

Sometimes the deformation of the bushing, which causes the external bulge, also affects the grip zone. In particular, a swelling may form on the inside of the bushing, close to the external bulge. When installing the rivet, this internal swelling may lead to seizure between the grip zone of the bushing and the shank of the pin, requiring more tightening force to be applied.

The aim of this invention is to resolve this issue, specifically by making it easier to tighten the pin in the bushing once the external bulge has been formed.

To this end, the subject matter of the invention is a rivet of the aforementioned type, in which the shank of the pin comprises a first and a second cylindrical portion connected by a shoulder, the first portion being adjacent to the head and having a first diameter, the second portion being adjacent to the threaded portion and having a second diameter, smaller than the first diameter.

According to other advantageous aspects of the invention, the rivet comprises one or more of the following feature(s), taken individually or according to all the possible technical combinations:
- the second diameter is between 80% and 95% of the first diameter;
- the shoulder is configured so that it forms a progressive transition between the first and second diameters;
- a maximum diameter of the threaded portion is less than or equal to the first diameter of the first portion of the shank;
- a maximum diameter of the threaded portion is less than or equal to the second diameter of the second portion of the shank;
- the rivet has a maximum gripping capacity and a minimum gripping capacity, the length of the second portion of the shank of the pin corresponding to a difference between said maximum and minimum gripping capacities;
- the pin also comprises a handling element connected to the head by a breakneck groove.

The invention further relates to an assembly comprising: at least one structure comprising opposite first and second surfaces and a bore opening onto each of said surfaces; and a rivet as previously described, in which: the collar of the bushing is in contact with the first surface; the head of the pin is in contact with said collar; the deformation zone of the body of the bushing is in an installed configuration, in the form of an external bulge in contact with the second surface; and the grip zone of the body of the bushing has an internal swelling adjacent to the external bulge, said swelling being positioned facing the second portion of the shank of the pin.

According to one preferential embodiment, a radial space is provided between the internal swelling of the bushing and the second portion of the shank of the pin.

The invention further relates to an installation method for an assembly such as that described previously, based on a rivet such as that previously described, said method comprising the following successive steps: assembly of the threaded portion of the pin with the tapped portion of the bushing, the deformation of the body of said bushing being initially in a cylindrical configuration; insertion of the bushing in the bore of the structure, from the side of the first surface; holding the collar in contact with the first surface and axial traction on the pin, so that the deformation zone of the body of the bushing is deformed to form the external bulge of the installed configuration, the internal swelling of the grip zone being formed simultaneously; and tightening the pin in the bushing until the head of the pin contacts the collar of the bushing, the second portion of the shank of the pin thus being positioned facing the internal swelling.

According to one preferential embodiment, the rivet comprises a handling element, said method then comprising a step in which the handling element separates from the head of the pin, by breakage of the breakneck groove.

The invention will be better understood upon reading the following description, which is provided solely by way of a non-limiting example and with reference to the drawings, in which.

Figure 1:
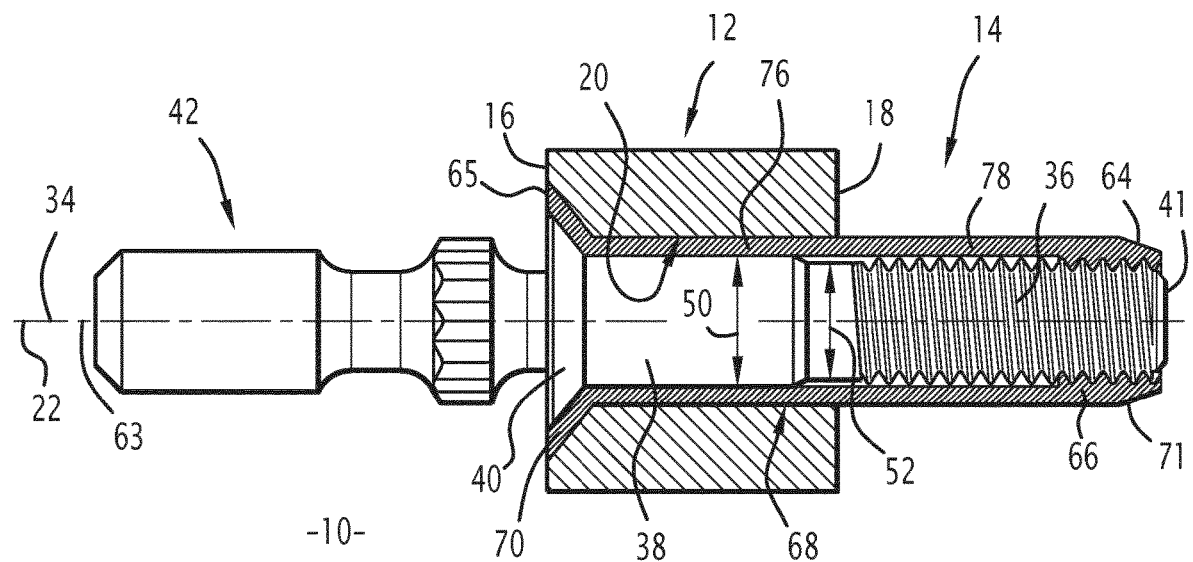
FIG. 1 is a cross-sectional view of an assembly according to one embodiment of the invention, in an initial configuration.

FIGS. 1 to 4 show an assembly 10 according to the same embodiment of the invention. The assembly 10 comprises a structure 12 and a rivet 14.

The structure 12 comprises a first face 16 and a second face 18, opposite the first face 16. The first face 16 and second face 18 are substantially planar and parallel to each other.

The first face 16 of the structure 12 is considered to be accessible to an operator and the second face 18, or blind face, not to be accessible.

Preferably, the first face 16 and second face 18 belong to at least two distinct structural elements. Said structural elements are metal or made of composite materials, for example. A single structural element is shown in FIGS. 1 to 4 for simplicity.

The structure 12 further comprises a bore 20 opening on both the first face 16 and the second face 18. The bore 20 is positioned along a first axis 22 substantially perpendicular to the first face 16 and the second face 18.

The bore 20 comprises a countersunk surface 24, adjacent to the first face 16, and a cylindrical surface 26, adjacent to the countersunk surface and extending from there up to the second face 18. The countersunk surface 24 is substantially a truncated cone shape.

The rivet 14 is capable of rigidly connecting together the elements forming the structure 12. Said rivet comprises a pin 30 and a bushing 32, intended to be inserted in the bore 20. Preferably, the pin 30 and the bushing 32 are metal, for example, made of A286 stainless steel or titanium alloy.

The pin 30 comprises a threaded portion 36, a shank 38 and a head 40, aligned along a second axis 34. One first end 41 of the pin 30, along said second axis 34, is formed by a free end of the threaded portion 36. The pin 30 further comprises a handling element 42, adjacent to the head 40 and forming a second end of the pin 30 along the second axis 34.

Figure 2:
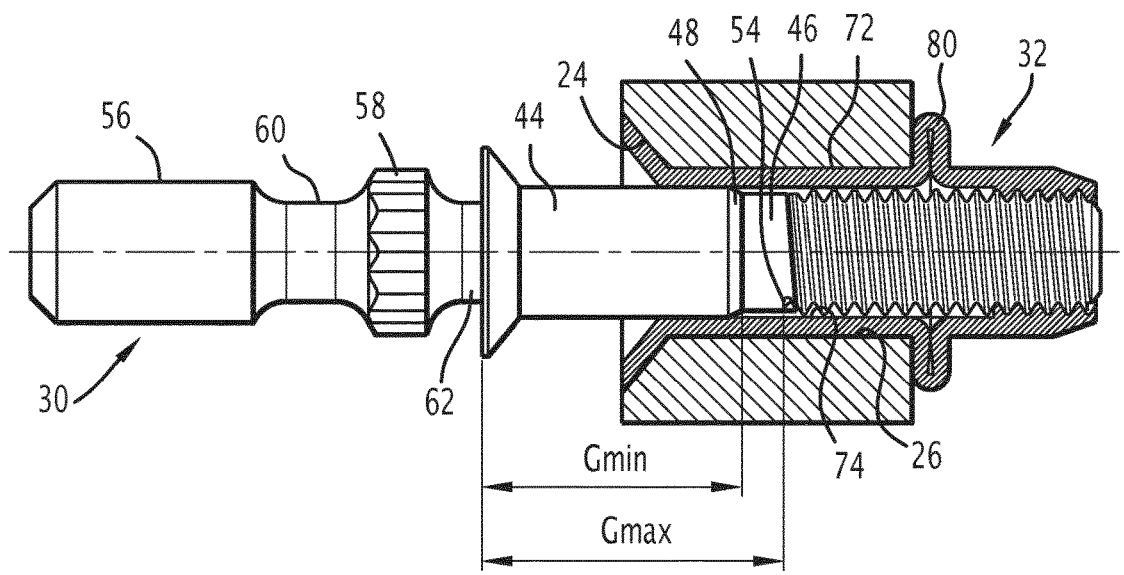
FIG. 2 is a cross-sectional view of the assembly of FIG. 1 in an intermediate installation configuration.
Figure 3:
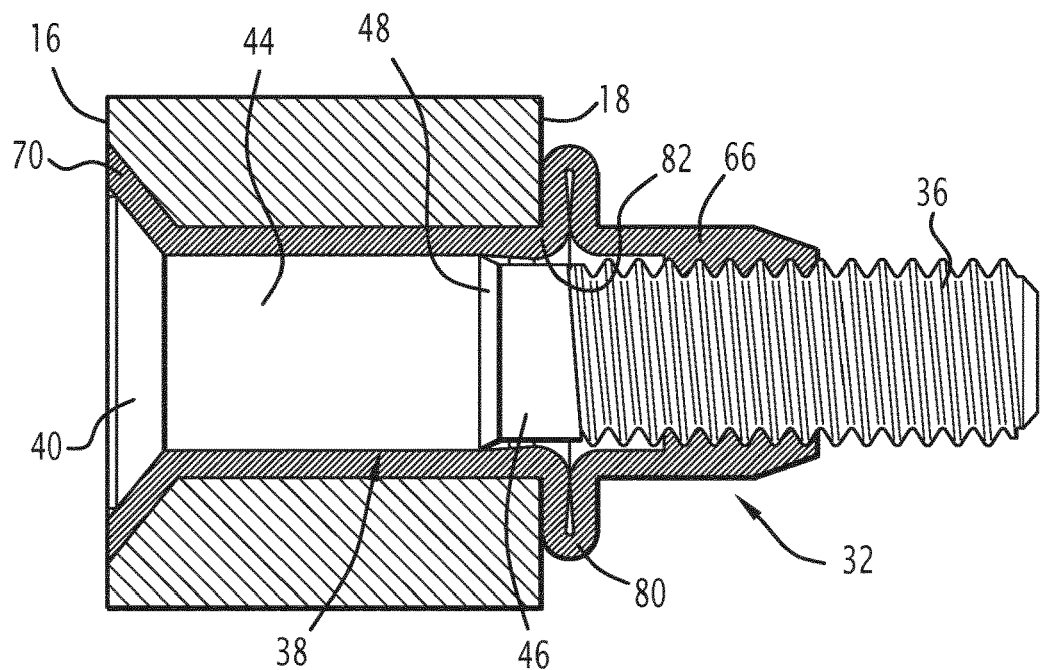
FIG. 3 is a partial cross-sectional view of the assembly of FIGS. 1 and 2 in an installed configuration.
Figure 4:
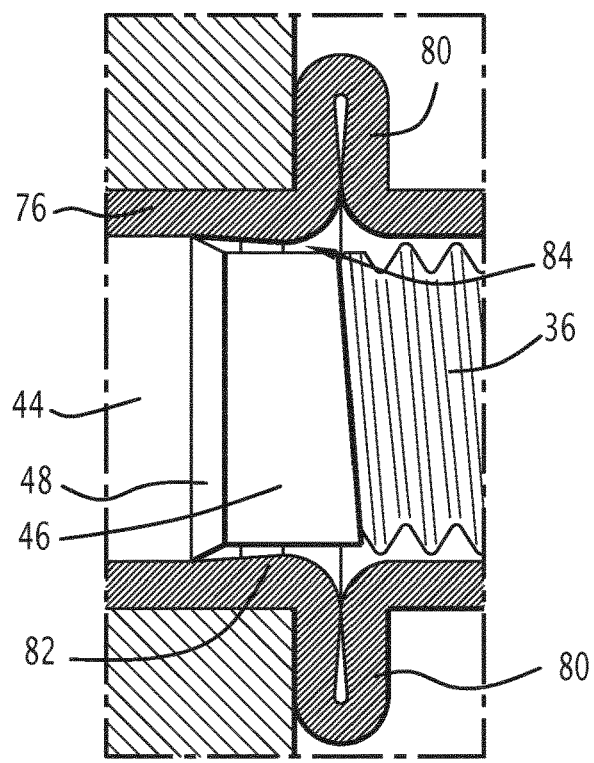
FIG. 4 is a detailed view of FIG. 3.
Figure 5:
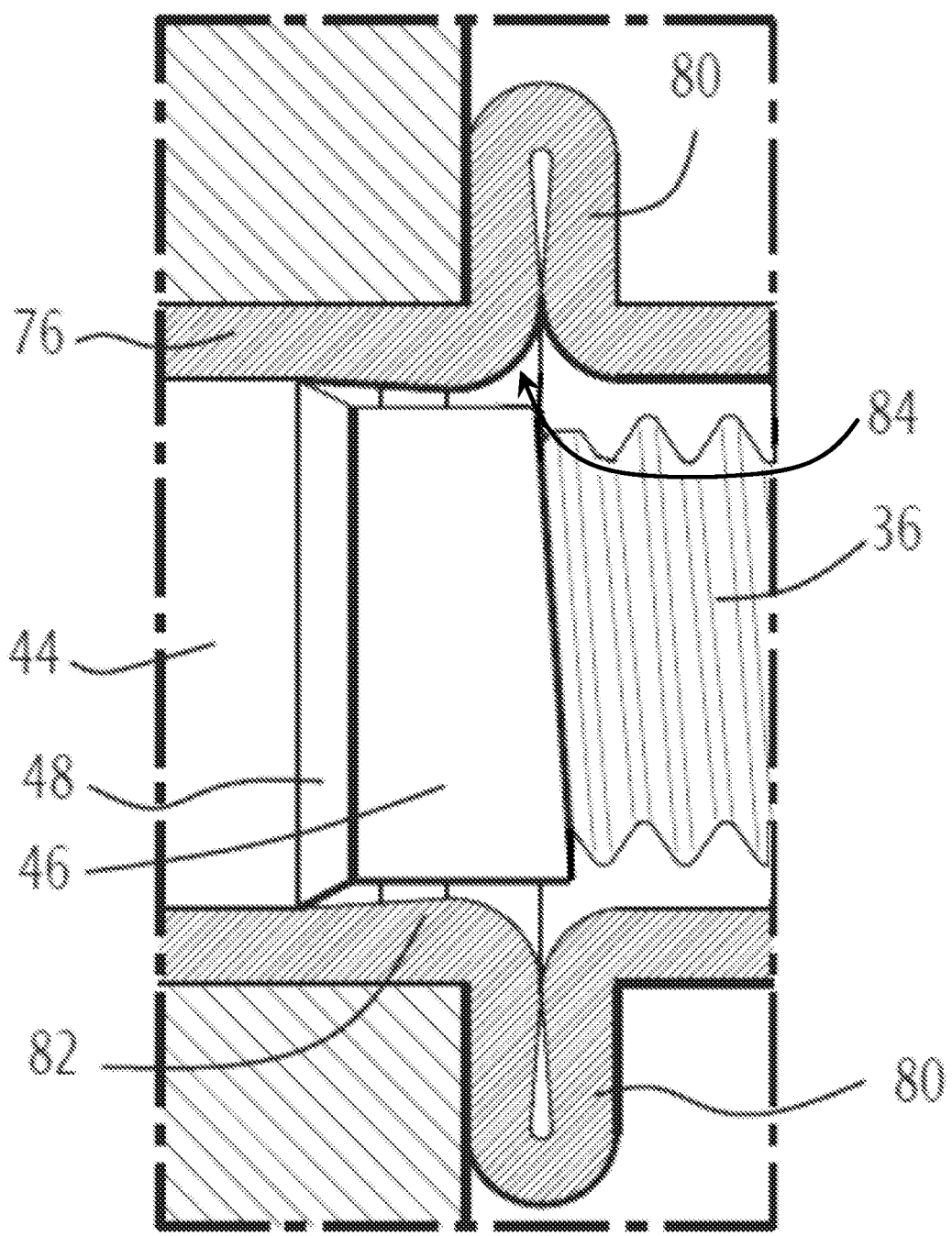
FIG. 5 is a detailed view of an alternative configuration to the assembly of FIG. 3 in which the threads have a smaller maximum diameter than that of a second portion of a shank of a rivet.

In the embodiment of FIGS. 1 to 4, the head 40 is a countersunk head intended to be flush with the first face 16 of the structure 12 in the installed configuration of FIG. 4.

The shank 38 of the pin comprises a first portion 44 and a second portion 46, connected by a shoulder 48. Each of the portions, the first 44 and the second 46, has a substantially rotationally cylindrical shape aligned along the second axis 34.

The first portion 44 is adjacent to the head 40 and has a first diameter 50. The second portion 46 is adjacent to the threaded portion 36 and has a second diameter 52, smaller than the first diameter 50. As an indication, the second diameter 52 is between 80% and 95% of the first diameter 50.

The shoulder 48 between the first portion 44 and the second portion 46 preferably forms a progressive transition between the first diameter 50 and the second diameter 52. The shoulder 48 is for example a truncated cone shape or concave.

The rivet 14 has a maximum gripping capacity $G_{max}$ (FIG. 2), which corresponds to the maximum thickness of the structure 12 that the rivet 14 can assemble. This maximum gripping capacity $G_{max}$ is represented by a length of the head 40 and of the shank 38 along the second axis 34, until a limit 54 of the threaded portion 36.

Similarly, the rivet 14 has a minimum gripping capacity $G_{min}$ (FIG. 2), which corresponds to the minimum thickness of the structure 12 that the rivet 14 can assemble. In the embodiment of FIGS. 1 to 4, the thickness of the structure 12 along the first axis 22 is between $G_{max}$ and $G_{min}$.

At the current state of the technology, the minimum gripping capacity $G_{min}$ is defined by the manufacturer but is not necessarily marked on the rivet. In the context of this invention, a length of the second portion 46 of the shank 38, along the second axis 34, is preferably chosen to correspond to a difference between $G_{max}$ and $G_{min}$. The maximum and minimum gripping capacities of the rivet 14 are therefore visible on the pin 30.

The handling element 42 of the pin 30 is designed to engage with an installation tool for automated installation of the rivet 14. The handling element 42 comprises, for example, a first handling portion 56 and a second handling portion 58 connected by a blocking portion 60. The first handling portion 56 and second handling portion 58 and the blocking portion 60 are respectively intended to guide the introduction of the rivet 14 into an installation tool, to transfer a torsion torque and to limit an axial movement of the rivet in the installation tool. A rivet comprising such a handling element, as well as its cooperation with an installation tool, are particularly disclosed in document FR3016617.

The handling element 42 is connected to the head 30 by a breakneck groove 62. Said groove is notably configured so that it withstands a certain amount of tensile stress along the second axis 34, and to yield beyond a certain torsional stress threshold around said second axis.

The bushing 32 is of tubular shape, positioned along a third axis 63 and open at a first end 64 and a second end 65. In the initial configuration of FIG. 1, a total length of the bushing along the third axis 63, between the first end 64 and the second end 65, is substantially equal to the sum of the lengths of the threaded portion 36, the shank 38 and the head 40 of the pin 30.

The bushing 32 comprises a tapped portion 66, a smooth body 68 and a flared collar 70, aligned along the third axis 63.

The tapped portion 66, one free end of which forms the first end 64, is designed to engage with the threaded portion 36 of the pin 30. Preferably, close to the first end 64, the tapped portion 66 comprises a chamfer 71 to facilitate its introduction into the bore 20.

The collar 70, one end of which forms the second end 65, is designed to receive the head 40 of the pin 30. The collar 70 projects radially relative to the smooth body 68. In the embodiment of FIGS. 1 to 4, the collar 70 is substantially a truncated cone shape, matching the countersunk head 40.

The smooth body 68 has one external surface 72 and one internal surface 74. In the initial configuration of FIG. 1, both the external surface 72 and the internal surface 74 have a rotationally cylindrical shape around the third axis 63.

Preferably, one diameter of the internal surface 74 is slightly larger than the first diameter 50 of the first portion 44 of the shank 38, so that there is slight clearance between said shank 38 and the smooth body 68. Similarly, one diameter of the external surface 72 is slightly smaller than the diameter of the cylindrical surface 26 of the bore 20, so that there is slight clearance between said surfaces.

In a variant, one diameter of the internal surface 72 is slightly larger than the diameter of the cylindrical surface 26 of the bore 20, so that there is negative clearance between said surfaces.

Preferably, one maximum diameter of the threaded portion 36 is less than or equal to the first diameter 50 of the first portion 44 of the shank 38, to ensure that there is slight clearance between said threaded portion 36 and the smooth body 68, at least in the initial configuration of the rivet. "Maximum diameter" refers to a diameter corresponding to the summits of the threads. The thread complies for example with standard AS8879, in which the summits of the threads are truncated. To ensure that there is slight clearance between said threaded portion 36 and the smooth body 68 in all the configurations of the rivet, the summits of the threads of the pin may be more truncated than for standard AS8879, the thread of the bushing remaining compliant with standard AS8879.

To facilitate manufacture of the pin, the diameter of the threaded portion before rolling is equal to the second diameter 52. Thus the pin before rolling comprises a first portion 44 with a first diameter, and a second portion extending until the end of the pin with a second diameter smaller than the first diameter, that is identical for the full length of the second portion. After the end is rolled, the threaded portion 36 obtained has a thread flank diameter equal to the second diameter 52.

In a variant, the maximum diameter of the threaded portion 36 is less than or equal to the second diameter 52 of the second portion 46 of the shank 38, to ensure that there is slight clearance between said threaded portion 36 and the smooth body 68, in all the configurations of the rivet. The thread of the pin and of the tapped portion of the bushing may be compliant with standard AS8879. In this embodiment, it should be ensured that the minimum diameter of the threaded portion 36 of the pin, measured from the root diameter of the thread, and the number of threads, is sufficient to resist the traction force applied to the pin.

The smooth body 68 comprises a grip zone 76 and a deformation zone 78 aligned along the third axis 63. The grip zone 76, adjacent to the collar 70, is notably designed to receive the shank 38 of the pin 30. The deformation zone 78, between the grip zone 76 and the tapped portion 66, preferably has an elastic strength lower than the elastic strength of the rest of the bushing 32. This low elastic resistance is, for example, obtained by selectively annealing the deformation zone 78 by means of an induction machine after the formation of the bushing 32.

The deformation zone 78 is designed to form an external bulge 80 in contact with the second face 18 of the structure 12, particularly in the installed configuration of FIG. 3.

A method for installing the assembly 10, comprising the formation of the external bulge 80, will now be described.

Firstly, the pin 30 and the bushing 32 are assembled to form the rivet 14. More specifically, the first end 41 of the pin 30 is introduced into the bushing 32, from the side with the collar 70; then the threaded portion 36 of the pin 30 is threaded into the threaded portion 66 of the bushing 32, until the head 40 of the pin comes into abutment against the collar 70, which is a matching truncated cone shape.

The rivet 14, in the initial configuration of FIG. 1, is thus formed. The first end 41 of the pin 30 is close to the free end 64 of the tapped portion 66.

The following steps are performed, for example, using an installation tool engaged with the handling element 42 of the pin 30, in a similar manner to the method disclosed in document FR3016617.

The rivet 14 in the initial configuration is introduced into the bore 20 from the first accessible face 16 of the structure 12. The rivet 14 is moved along the first axis 22, until it comes into abutment with the collar 70 of the bushing 32 against the truncated cone shape 24 of said bore.

The assembly 10 is thus formed, in the initial configuration of FIG. 1. The first axis 22, second axis 34 and third axis 63 are identical. The free end 65 of the collar 70 of the bushing 32, as well as the breakneck groove 62 of the pin 30, are flush with the first accessible face 16 of the structure 12. The tapped portion 66 and the deformation zone 78 of the bushing 32, as well as the threaded portion 36 of the pin 30, form a projection outside the structure 12, on the side of the blind face 18.

The bushing 32 is then held in place in the bore 20, for example by exerting axial pressure against the end 65 of the collar 70. Axial traction is simultaneously applied to the pin 30, so that the first end 41 of said pin moves closer to the structure 12. The threaded portion 66 of the bushing is drawn along by the movement of said first end 41, which causes plastic deformation of the deformation zone 78. Said plastic deformation results in the external bulge 80 being formed against the second surface 18.

The assembly 10 is then in the intermediate configuration of FIG. 2. The external bulge 80 and the second face 18, on the one hand, and the collar 70 and the truncated cone shape 24, on the other hand, form opposite stops that axially block the bushing 32 in the bore 20. The total length of the bushing 32 between the first end 64 and the second end 65 is less than the total length of the bushing in the initial configuration. Furthermore, in the intermediate configuration, the external bulge 80 of the bushing is situated facing the threaded portion 36 of the pin.

The formation of the external bulge 80, by plastic deformation of the deformation zone 78, causes a slight deformation of the grip zone 76 close to said bulge. In particular, after formation of the external bulge 80, the grip zone 76 has an internal swelling 82 close to said external bulge. At the point of said internal swelling 82, the internal surface 74 has a diameter smaller than the diameter of said internal surface 74 in the rest of the grip zone 76.

When the maximum diameter of the threaded portion 36 is less than or equal to the first diameter 50 of the first portion 44 of the shank, and greater than the second diameter 52 of the second portion 46 of the shank 38, and depending on the thickness of the bushing, the material of the bushing and/or the traction force applied to the pin, the internal swelling 82 sometimes comes into contact with the summit of a thread. This contact has no negative effect on the installation of the rivet as the surfaces are in only slight contact because the thread essentially has a helical surface. One way to reduce the risk is to truncate the summit of the thread.

The next step of the installation process is screwing the threaded portion 36 of the pin 30 into the tapped portion 66 of the bushing 32. The pin 30 moves axially inside the bushing 32, until the head 40 comes into abutment against the collar 70. If the internal swelling 82 comes into contact with the summit of the thread, this thread will lightly tap into the swelling without transferring any torque to the bushing.

Finally, a torsion force is exerted on the gripping element 42 so as to break the pin 30 at the breakneck groove 62. The assembly 10 is then in the installed configuration, shown in FIG. 3 without the handling element 42.

In the installed configuration, the internal swelling 82 of the bushing 32 is located facing the second portion 46 of the shank 38 and/or the threaded portion 36.

More precisely, in the event that the thickness of the structure 12 is close to the minimum gripping capacity $G_{min}$, the internal swelling 82 is located facing the second portion 46 and potentially the shoulder 48. The second portion 46 essentially projects beyond the structure 12.

In the event that the thickness of the structure 12 is close to the maximum gripping capacity $G_{max}$, the internal swelling 82 is located facing the second portion 46 and the limit 54 of the threaded portion 36. The second portion 46 is essentially received within the bore 20.

The second diameter 52 of the second portion 46 of the shank 38 is configured to avoid seizure of the rivet 14 during the pin tightening step leading to the installed configuration. Preferably, the second diameter 52 is chosen so that a radial space 84 (FIG. 4) is created between the second portion 46 and the internal swelling 82 of the bushing.

Thus, the internal swelling 82 does not impede the tightening step after formation of the external bulge 80. In particular, it is not necessary to apply more tightening force to the pin at the end of the tightening step, before the head 40 comes into contact with the collar 70.

Another advantage associated with the second portion 46 of reduced diameter relative to the first portion is to eliminate any risk of rotation of the bushing during the step of inserting the pin into the bushing. Effectively, if the clearance between the inside of the bushing and the shank is very slight, there will be contact between the shank of the pin and the internal swelling 82 around the full circumference of the shank and the swelling. The larger the contact surface area between the two elements, the greater the friction caused by the rotation of the pin in the bushing.

In comparison, a pin fitted with a shank with a single diameter equivalent to the first portion, maximized to increase the shear strength of the rivet, will therefore have a high risk of rotation of the bushing.

In another comparison, a pin fitted with a shank with a single diameter equivalent to the second portion, making it possible to avoid rotating the bushing, will have the inconvenience of a lower shear strength.

According to one variation (not shown) to the embodiment of FIGS. 1 to 4, the head 40 of the pin 30 is a protruding head, intended to form a projection relative to the first face 16 of the structure 12. The bore 20 is therefore cylindrical in shape without any countersink 24. The collar 70 of the bushing 32 is substantially flat and abuts against the first face 16 of the structure 12. According to this variant, the length of the head 40 is not between the maximum gripping capacity $G_{max}$ and minimum gripping capacity $G_{min}$ of the rivet 14.

The invention claimed is:

1. Rivet, comprising:
   a pin comprising: a threaded portion, a shank, a head, and a handling element connected to the head with a breakneck groove; and
   a bushing comprising an essentially cylindrical body, said body comprising a tightening zone having a tightening zone internal diameter, designed to receive the shank of the pin, and a deformation zone, adjacent to the tightening zone, designed to form an external bulge; a collar adjacent to the tightening zone, designed to receive the head of the pin; and a tapped portion adjacent to the deformation zone and designed to engage with the threaded portion of the pin;
   the rivet being characterized by the fact that the shank of the pin comprises a first cylindrical portion and a second cylindrical portion connected by a shoulder, the first portion being adjacent to the head and having a first diameter, the second portion being adjacent to the threaded portion and having a second diameter, smaller than the first diameter and configured such that the second portion of the shank and an adjacent portion of the bushing define a radial space between them such that at least part of the space can be occupied by internal swelling of the deformation zone, wherein the internal swelling comprises a reduction of an internal diameter of the adjacent portion of the bushing in the deformation zone at the radial space to be less than the tightening zone internal diameter.

2. Rivet according to claim 1, in which the second diameter is between 80% and 95% of the first diameter.

3. Rivet according to claim 1, in which the shoulder is configured so that it forms a progressive transition between the first diameter and the second diameter.

4. Rivet according to claim 1, in which a maximum diameter of the threaded portion is less than or equal to the first diameter of the first portion of the shank.

5. Rivet according to claim 1, in which a maximum diameter of the threaded portion is less than or equal to the second diameter of the second portion of the shank.

6. Rivet according to claim 1, in which the rivet has a maximum gripping capacity ($G_{max}$) and a minimum gripping capacity ($G_{min}$), the length of the second portion of the shank of the pin corresponding to a difference between said maximum and minimum gripping capacities.

7. Assembly comprising:
   at least one structure comprising an opposite first surface and second surface and a bore opening on each of said surfaces; and
   a rivet comprising:
      a pin comprising: a threaded portion, a shank and a head; and
      a bushing comprising an essentially cylindrical body, said body comprising a tightening zone having a tightening zone internal diameter designed to receive the shank of the pin, and a deformation zone, adjacent to the tightening zone, designed to form an external bulge; a collar adjacent to the tightening zone, designed to receive the head of the pin; and a tapped portion adjacent to the deformation zone and designed to engage with the threaded portion of the pin;
   the shank of the pin comprising a first cylindrical portion and a second cylindrical portion connected by a shoulder, the first portion being adjacent to the head and having a first diameter, the second portion being adjacent to the threaded portion and having a second diameter, smaller than the first diameter,
   in which:
   the collar of the bushing is in contact with the first surface;
   the head of the pin is in contact with said collar;
   the deformation zone of the body of the bushing is in an installed configuration, in the form of an external bulge in contact with the second surface; and
   the tightening zone of the body of the bushing has an internal swelling adjacent to the external bulge, said internal swelling being positioned facing the second portion of the shank of the pin, wherein the internal swelling comprises a reduction of an internal diameter of the adjacent portion of the bushing in the deformation zone at the radial space to be less than the tightening zone internal diameter.

8. Assembly according to claim 7, wherein the rivet includes a handling element connected to the head with a breakneck groove.

9. Assembly according to claim 7, in which a radial space is provided between the internal swelling of the bushing and the second portion of the shank of the pin.

10. Method for installing an assembly according to claim 7
    said method comprising the following steps:
    inserting an assembly of the pin and the bushing in the bore of the structure, from the side of the first surface, wherein the threaded portion of the pin is threaded into the tapped portion of the bushing and the deformation zone of the body of said bushing is in an initial cylindrical configuration;
    holding the collar in contact with the first surface and applying axial traction on the pin, so that the deformation zone of the body of the bushing is deformed to form the external bulge of the installed configuration, the internal swelling of the tightening zone being formed simultaneously; and
    tightening the pin in the bushing until the head of the pin contacts the collar of the bushing, the second portion of the shank of the pin thus being positioned facing the internal swelling.

11. Installation process according to claim 10, based on a rivet wherein the rivet includes a handling element connected to the head with a breakneck groove; said method then comprising a step in which the handling element separates from the head of the pin, by breakage of the breakneck groove.

\* \* \* \* \*